United States Patent [19]

Paulis et al.

[11] 4,323,094

[45] Apr. 6, 1982

[54] CRASHWORTHY AIRCRAFT FUEL STORAGE SYSTEM

[75] Inventors: George J. Paulis, Trumbull; Joseph D. DeCarlo, Bridgeport, both of Conn.

[73] Assignee: United Technologies Corporation, Hartford, Conn.

[21] Appl. No.: 207,555

[22] Filed: Nov. 14, 1980

[51] Int. Cl.³ ............................................. F16K 13/04
[52] U.S. Cl. .............................. 137/68 R; 137/614.03; 137/614.06; 137/899.2; 220/86 R; 285/4; 244/135 R
[58] Field of Search ................... 244/135 R; 285/2, 3, 285/4; 220/86 R; 251/144; 137/614, 614.03, 614.06, 68 R, 899.2

[56] References Cited

U.S. PATENT DOCUMENTS

| | | | |
|---|---|---|---|
| 1,443,466 | 1/1923 | Gill | 220/86 R |
| 2,466,075 | 4/1949 | Bentley | 220/86 R |
| 3,043,542 | 7/1962 | Neuschotz | 244/135 R |
| 3,312,431 | 4/1967 | Vogt | 244/135 R |
| 3,719,194 | 3/1973 | Anderson | 137/68 R |

Primary Examiner—Harold W. Weakley
Attorney, Agent, or Firm—Vernon F. Hauschild

[57] ABSTRACT

A crashworthy aircraft fuel storage system normally operative so that the fuel tank, fuel shut-off valve assembly and the fuel inlet connection to the fuel tank are normally assembled to be free floating with respect to the aircraft structure, and further operative so that crash load conditions will cause the fuel tank to move with respect to the aircraft structure to thereby cause fuel inlet fitting to move therewith and into contact with the aircraft structure so as to impose a momentum force on the fuel shut-off valve assembly to cause fracture thereof and separation of the fuel tank from the fuel inlet fitting, with both parts so separated, sealed to prevent fuel flow therethrough.

2 Claims, 2 Drawing Figures

FUEL TANK MOTION →

CRASHWORTHY AIRCRAFT FUEL STORAGE SYSTEM

The Government has rights in this invention pursuant to Contract No. N00019-75-C-0267 awarded by the Department of the Navy.

DESCRIPTION

2. Technical Field

This invention relates to the safe storage of fuel in aircraft and more particularly to such a system in which the fuel tank, its fuel intake connection, and a frangible self-sealing valve assembly are assembled to be free floating with respect to the aircraft structure and which, under crash load conditions, will respond to fuel tank movement with respect to the fuselage to rupture the frangible self-sealing valve assembly, so that the fuel tank is free of the aircraft structure and both the fuel tank and the fuel inlet connection are sealed to prevent fuel flow from each.

2. Background Art

In the aircraft fuel tank art, it is conventional practice to provide a fuel tank shut-off valve assembly which is bolted to both the fuel tank and the aircraft structure, so that when the fuel tank attempts to move away from the aircraft structure under crash loading conditions, the shut-off valve assembly fractures to permit the fuel tank to depart the aircraft structure and also results in sealing of the fuel within the fuel tank and within the fuel tank inlet fitting. In such a structure, in which the self-sealing valve is attached to both the fuel tank and the aircraft structure, difficulty is experienced because it is necessary that the fuel tank openings and the fuselage openings match closely, thereby presenting the requirement of close machining tolerances both for these structures and the connecting mechanism used between the self-sealing valve and the aircraft structure and fuel cell. This prior art structure also required substantial installation time in view of the close alignment problems during installation. Further, any machining tolerance deviation or installation errors resulting in misalignment between the fuel tank and aircraft structure resulted in a preload on the frangible shut-off valve assembly, thereby reducing the force required to actuate that valve assembly, which could result in inadvertent fuel shut-off during flight.

Prior art constructions of this general type are shown in U.S. Pat. Nos. 3,035,797 and 3,043,542 to R. Neuschotz entitled Detachable Connector Assembly for Fuel Cells and Frangible Connector Assembly for Fuel Cells and issued May 12, 1962 and July 10, 1962, respectively; U.S. Pat. No. 3,312,431 to C. L. Vogt entitled Crash-Actuated Closure Valve and issued Apr. 4, 1967; U.S. Pat. No. 3,026,070 to R. W. Sutton et al entitled Fuel Tank Fitting and issued Mar. 20, 1962; U.S. Pat. No. 3,630,214 to Levering entitled Frangible Coupling and issued Dec. 28, 1970, and U.S. Pat. No. 3,719,194 to Anderson et al entitled Breakaway Coupling and issued Mar. 6, 1973.

DISCLOSURE OF INVENTION

A primary object of the present invention is to provide a crashworthy aircraft fuel storage system in which the fuel inlet line is connected to the fuel tank through a frangible, self-sealing shut-off valve assembly which parts, when so assembled, are free floating and therefore independent of the aircraft structure during normal operation, so that no close tolerances are encountered in aircraft fitting hole locations or the assembly of parts at installation, and in which no loading is imposed upon the self-sealing valve assembly during normal operation.

In accordance with the present invention, the fuel shut-off valve assembly is connected to the fuel tank and is independent of aircraft structure, the fuel inlet line includes a large diameter circumferential end flange which is positioned on the opposite side of an aircraft apertured structure from the fuel tank and in spaced relationship thereto so that during normal operation the fuel tank abuts the aircraft structure, but under crash loading, the fuel tank departs the aircraft structure causing the end flange to impact the aircraft structure so as to create a momentum tension loading of the self-sealing valve assembly to cause fracture thereof, thereby freeing the fuel tank from the aircraft structure and sealing off both the fuel tank and the fuel inlet line.

It is a further object of our invention to provide such a system which is easy and inexpensive to manufacture, light in weight, and which requires no connecting mechanism to the aircraft.

Other features and advantages will be apparent from the specification and claims and from the accompanying drawings which illustrate an embodiment of the invention.

BEST MODE FOR CARRYING OUT THE INVENTION

Figure 1:
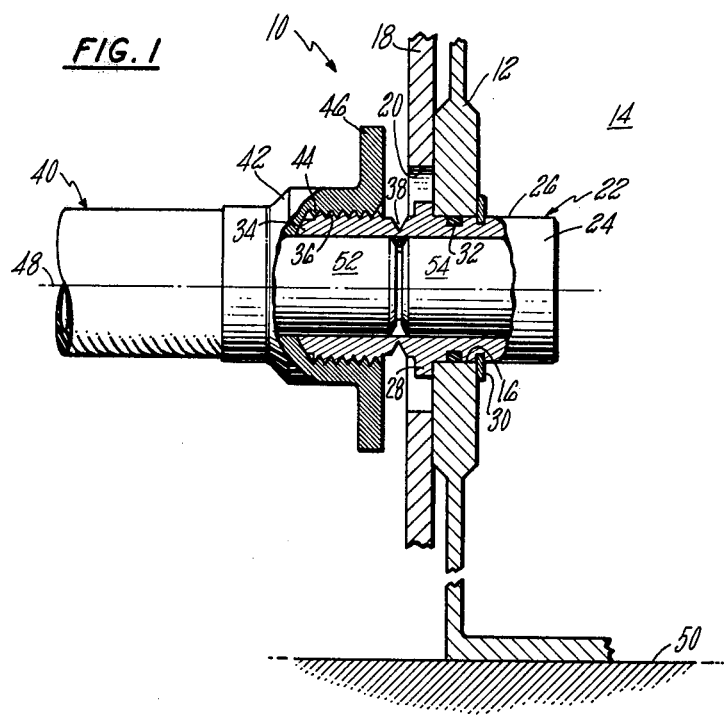
FIG. 1 is a cross-sectional drawing showing our fuel storage system in its normally operative position.

Referring to FIG. 1 we see our fuel storage system 10 shown in its normal mode of operation. Fuel tank 12 is of conventional construction so as to form an enclosed vessel defining fuel storing cavity 14 therein and having an inlet port 16. During normal operation, fuel tank 12 abuts fuselage or other fixed aircraft structure 18, which includes aperture 20 in register with inlet port 16 and substantially larger than inlet portion 16. Frangible self-sealing full shut-off valve assembly 22 includes frangible sleeve member 24, which has a first end 26 which connects sleeve member 24 to the fuel tank 12 at inlet port 16 through the cooperation of sleeve flange 28 and retaining ring member 30. Circumferential seal 32 is preferably positioned between fuel tank inlet port 16 and sleeve member 24 to prevent fuel leakage therebetween. Sleeve member 24 also includes a second end 34, which, in the FIG. 1 normal mode of operation, is positioned on the opposite side of aircraft structure 18 from fuel tank 12. Sleeve member end 34 has OD threads 36. Circumferential groove 38 is positioned between sleeve member ends 26 and 34. The function of groove 38 is to weaken sleeve member 24 so that it is prone to fracture at that station in response to tension loading. It should be noted that there is substantial clearance between fuselage aperture 20 and valve assembly 22 thereby eliminating any requirement for close machining tolerances, exact alignment during assembly, and any loading of valve assembly 22 by aircraft structure 28 due to any misalignment therebetween.

Fuel will be introduced into the interior 14 of fuel tank 12 through flexible fuel hose 40, which includes end fitting 42 having ID threads 44 which threadably engage OD threads 36 of valve assembly 22, thereby sealably joining the fuel inlet hose 40 to fuel tank 12 through valve assembly 22. End fitting 42 also includes an end flange 46, which is preferably circumferential, and which is sized so that it cannot pass through aircraft aperture 20. It is also important to note that end flange 46 is laterally spaced from fixed structure 18 and is located on the opposite side thereof from fuel tank 12.

Preferably, fuel tank inlet port 16, valve assembly 22, aircraft structure port 20 and end fitting 42 are all of circular cross section and concentric about axis 48.

Viewing the FIG. 1 normal mode of operation of our fuel storage system 10, it will be noted that fuel tank 12 abuts structure 18, and tank 12 is supported from and is free to move along fixed surface 50, which may be part of the fuselage. Further, in the FIG. 1 mode, with fuel tank 12 connected to inlet fuel hose end fitting 42 through valve assembly 22, these members so assembled are in free floating relationship to aircraft structure 18 and, therefore, no loads are imposed therebetween.

It is important in the construction of self-sealing fuel shut-off valve assembly 22 that it include sealing members 52 and 54 which, in conventional fashion with the fuel storage system in its FIG. 1 normal mode of operation, operate to permit the flow of fuel therethrough from inlet hose 40 into tank 14. However, should valve assembly 22 be ruptured at the station of circumferential groove 38, members 52 and 54 operate to seal off the entrance to fuel tank 12 and the exit of fuel inlet line 40 so that fuel cannot flow either out of tank 12 or hose 40. This is conventional self-sealing valve construction which may be of the type fully disclosed and described in U.S. Pat. No. 3,719,194 to Anderson et al entitled Breakaway Coupling granted Mar. 6, 1973.

It will be evident that during and following an aircraft hard landing or crash, it is important that no fuel be spilled which could ignite and explode under the proper conditions and this undesirable result is prevented by valve assembly 22 as described above.

Figure 2:
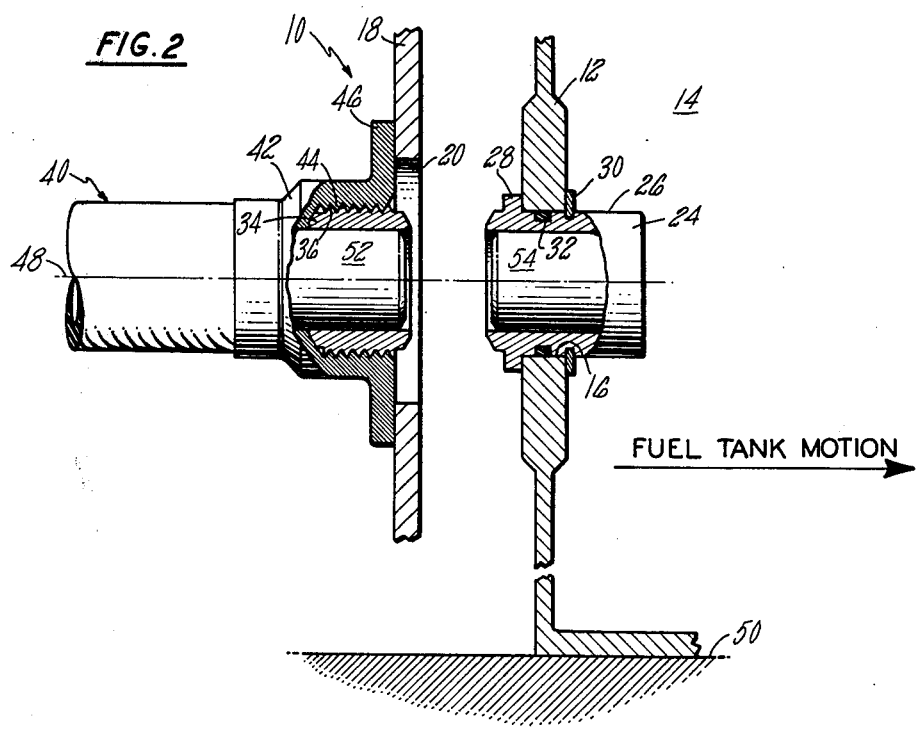
FIG. 2 is a cross-sectional drawing showing our fuel storage system following fracture of the self-sealing valve assembly.

Should the aircraft experience a very hard landing or crash, if the crash intensity load placed upon fuel tank 12 causes fuel tank 12 to move to the right as shown in FIG. 1, this motion of the fuel tank, as best shown in FIG. 2, will cause end fitting circumferential flange 46 to move toward and eventually impact fixed aircraft structure 18 thereby creating a momentum force which results in tension loading of sleeve member 24 of valve assembly 22 which, if beyond design limits, will cause sleeve member 24 to fracture at circumferential groove 38 as shown in FIG. 2, whereupon the fuel tank 12, with severed sleeve member end 26 attached thereto, will move further away from aircraft structure 18 and be free thereof, while sealing members 52 and 54 will coact to seal off the inlet of fuel tank 12 and the outlet to fuel hose 40, thereby preventing seepage or leakage of the fuel from either.

If the crash loading were such that the fuel tank 12 was induced thereby to move leftwardly, this would merely cause the fuel tank to bear more firmly against structure 18 but, in all likelihood, would not cause valve assembly 22 to rupture because hose 40 is lightly loaded. If valve rupture were so caused, however, separation of the fuel tank and the fuel inlet hose would occur and both would be sealed off as described above.

It should be understood that the invention is not limited to the particular embodiments shown and described herein, but that various changes and modifications may be made without departing from the spirit and scope of this novel concept as defined by the following claims.

We claim:

1. Crashworthy aircraft fuel storage system comprising:
   a fixed bulkhead having an aperture therein;
   a fuel tank adapted to abut said bulkhead during normal operation and having a fuel inlet port therein in register with said bulkhead aperture;
   a fuel shut-off valve assembly comprising:
      a frangible sleeve member having a first end connected to the fuel tank inlet port and extending therefrom through said bulkhead aperture with clearance therebetween and having a second end with threads thereon located on the opposite side of said bulkhead from said fuel tank, and further having a circumferential groove therein positioned between said threads and said first end to provide a weak section in said sleeve member to induce sleeve member fracture therearound in response to sleeve member tension loading beyond design limits, and
      automatic sealing means positioned within said sleeve member and operable to permit fluid flow through said valve when said sleeve member is intact and to prevent fluid flow through both ends of said sleeve member when separated following sleeve member fracture,
   a flexible hose member having an end fitting threadably engaging said frangible sleeve member threads and having a circumferential end flange extending therefrom in spaced relationship to said bulkhead so that said fuel tank, valve and hose member so assembled are in free floating relationship to the bulkhead except for said fuel tank-to-bulkhead abutments and said end flange sized so that it cannot pass through said bulkhead aperture, so that under crash load conditions said fuel tank will move away from said bulkhead and cause said fitting end flange to forceably impact said bulkhead thereby causing said frangible sleeve member to fracture and said automatic sealing means to seal off both ends of the sleeve member so fractured.

2. A fuel storage system as in claim 1 wherein said fuel tank inlet port, said bulkhead aperture, said valve, and said flexible hose fitting are of circular cross section and concentric about a common axis when assembled for normal operation.

* * * * *

UNITED STATES PATENT AND TRADEMARK OFFICE
CERTIFICATE OF CORRECTION

PATENT NO. : 4,323,094

DATED : April 6, 1982

INVENTOR(S) : George J. Paulis; Joseph D. DeCarlo

It is certified that error appears in the above-identified patent and that said Letters Patent is hereby corrected as shown below:

Col. 2, Line 45    "portion" should read --port--

Line 65    "28" should read --18--

Signed and Sealed this

Fifteenth Day of November 1983

[SEAL]

Attest:

GERALD J. MOSSINGHOFF

*Attesting Officer*    *Commissioner of Patents and Trademarks*